United States Patent
Singh et al.

(10) Patent No.: US 9,521,187 B2
(45) Date of Patent: Dec. 13, 2016

(54) MANAGED FILED TRANSFER UTILIZING DYNAMIC HORIZONTAL AND VERTICAL SCALING

(71) Applicant: CLEARWIRE IP HOLDINGS LLC, Bellevue, WA (US)

(72) Inventors: Anurag Singh, Ashburn, VA (US); Bramh Gupta, Ashburn, VA (US); Frederick Yatzeck, Fairfax, VA (US); Somesh Dixit, Herndon, VA (US); Srinivas Mandadapu, Herndon, VA (US); Srinivasa Vallamkonda, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 543 days.

(21) Appl. No.: 13/941,281

(22) Filed: Jul. 12, 2013

(65) Prior Publication Data

US 2015/0019689 A1    Jan. 15, 2015

(51) Int. Cl.
*G06F 15/16* (2006.01)
*H04L 29/08* (2006.01)

(52) U.S. Cl.
CPC ............ *H04L 67/06* (2013.01); *H04L 67/02* (2013.01); *H04L 67/1008* (2013.01); *H04L 67/1023* (2013.01); *H04L 67/325* (2013.01)

(58) Field of Classification Search
CPC ...... H04L 67/02; H04L 67/06; H04L 67/1008; H04L 67/1023

USPC .................... 709/217–219, 232–235
See application file for complete search history.

(56) References Cited

U.S. PATENT DOCUMENTS

| | | | |
|---|---|---|---|
| 2006/0168113 A1* | 7/2006 | Jung ...................... | H04L 67/06 709/218 |
| 2006/0179155 A1* | 8/2006 | Bunting ................. | H04L 67/06 709/232 |
| 2012/0110136 A1* | 5/2012 | Beckley ................. | H04L 67/06 709/219 |
| 2013/0031209 A1* | 1/2013 | Howard ................. | H04L 67/06 709/217 |
| 2016/0142470 A1* | 5/2016 | Malinowski ........... | H04L 67/06 709/219 |

\* cited by examiner

*Primary Examiner* — Bharat N Barot

(57) ABSTRACT

An apparatus, methods, and computer program products are described which transfer files/data from one system to other. Source and target system can be external trading partners or internal enterprise applications. File transfers can be scaled horizontally or vertically, depending on the requirement without any server or application downtime. File transfers can also be managed and executed in different server/infrastructure zones as per the different regulatory requirements (e.g., PCI, CPNI, etc.) or security sensitivity using service demarcation. File transfer platforms can be patched or upgraded by isolating one or multiple components at a time without disrupting running production processes. Auto-recovery component can handle file transfer failures automatically without any manual intervention making the system self-healing. Periodic endpoint scanning is added to the platform to proactively scan and detect connectivity issues with trading partners or internal systems involved in file transfers.

16 Claims, 13 Drawing Sheets

─ 800
    ENGINE_1_SERVER      | app1-egs.perf.hrn.eai.clearitlab.com |
                  *
ENGINE_1_SERVER_URL      | app1-egs.perf.hrn.eai.clearitlab.com:8080 |
                  *
ENGINE_1_SERVER_GROUP    | SECURE ▼ |
                  *

FIG. 11

─ 850
                                        Select Flow:    | TEST1 ▼ |

| Previous |                                                    | Next |

GROUP  | SECURE ▼ |
                            *
                                        | Update |  | Clear |

FIG. 12

ENGINE_1_SERVER     app1-egs.perf.hrn.eai.clearitlab.com
ENGINE_1_SERVER_URL app1-egs.perf.hrn.eai.clearitlab.com:8080
ENGINE_1_SERVER_GROUP  LOCKED ▼

FIG. 14

Select Flow:  TEST1 ▼

Previous                              Next

GROUP  LOCKED ▼

Update  Clear

| Task Seq Number | Task Name | File Name in file system | File Name in file database | Task Status in database |
|---|---|---|---|---|
| 1 | scanTask | EAI342_57122_1_ABC.txt | EAI342_57122_1_ABC.txt | S |
| 2 | copyToTask | EAI342_57122_2_ABC.txt | EAI342_57122_2_ABC.txt | S |
| 3 | moveTask | EAI342_57122_3_ABC.txt | EAI342_57122_3_ABC.txt | S |
| 4 | qualityCheckTask | EAI342_57122_4_ABC.txt | EAI342_57122_4_ABC.txt | S |
| 5 | archiveTask | EAI342_57122_5_ABC.txt | EAI342_57122_5_ABC.txt | S |
| 6 | decryptTask | EAI342_57122_6_ABC.txt | EAI342_57122_6_ABC.txt | S |
| 7 | sftpPushTask | EAI342_57122_7_ABC.txt | EAI342_57122_7_ABC.txt | S |

FIG. 18

| Task Seq Number | Task Name | File Name in file system | File Name in file database | Task Status in database |
|---|---|---|---|---|
| 1 | scanTask | EAI342_57122_1_ABC.txt | EAI342_57122_1_ABC.txt | S |
| 2 | copyToTask | EAI342_57122_2_ABC.txt | EAI342_57122_2_ABC.txt | S |
| 3 | moveTask | EAI342_57122_3_ABC.txt | EAI342_57122_3_ABC.txt | S |
| 4 | qualityCheckTask | EAI342_57122_4_ABC.txt | EAI342_57122_4_ABC.txt | S |
| 5 | archiveTask | EAI342_57122_5_ABC.txt | EAI342_57122_5_ABC.txt | R |
| 6 | decryptTask | | | |
| 7 | sftpPushTask | | | |

MANAGED FILED TRANSFER UTILIZING DYNAMIC HORIZONTAL AND VERTICAL SCALING

TECHNICAL FIELD

This invention relates to a method, system, and apparatus for automated file transfer exchange between different systems and applications. File transfer processes are automated among multiple trading partners and corporate business systems in addition to providing higher-level management functionality over a file transfer process.

BACKGROUND

The design and development of a robust managed file transfer system remains complicated. Traditional systems with complex architecture (e.g., such as those offered by Metastorm and Axway) may incorporate multiple applications hosted across multiple server components. Despite advances in infrastructure, routine maintenance still has the potential to disrupt production processes when stopping and reloading applications and/or rebooting servers. The resulting downtime or service interruption can have a costly impact on mission-critical processes. Furthermore, these activities have to be coordinated with the relevant business stake holders and network operations teams. There may be insufficient storage space on the target server, and high-latency networks may slow the transfer of files. These and other issues can stem from poorly integrated file transfer processes.

The presently disclosed invention now provides solutions to such issues, along with additional attributes that ensure a secure and reliable managed file transfer system.

SUMMARY

In accordance with the principles of the presently disclosed inventions, methods, systems, and computer-readable media can be implemented for managing file transfers. The system can include a server that is configured for access the system over a network, with the server providing a common gateway for access to the MFT platform. The MFT platform includes a network interface, an engine, a database, and a common shared file storage. The network interface may be for communicating over the network. The engine may provide execution of file transfer processes. The database may contain configuration (e.g., all configurations) and process data such that platform components (e.g., all platform components) read a transfer configuration from the database and update data at every configurable milestone.

The MFT platform can further include at least one of a dynamic scaling module, a service demarcation module, an endpoint scanning module, an auto recovery module, a schedule module, and a hot deployment module. The dynamic scaling module may provide for scaling up or down dynamically without requiring restart during runtime horizontal and vertical scaling. The service demarcation module may provide for dedicating different servers for different kinds of file transfers. The endpoint scanning module may provide for periodic endpoint connectivity scanning, with the endpoint scanning module generating alerts for connectivity issues to be addressed before transfers start failing. The auto recovery module may provide for automatically identifying hung transfers (e.g., all hung transfers) and restarting a file transfer process from a state where the transfer process left off. The schedule module may provide for reading a transfer configuration from the database and schedules jobs (e.g., all jobs) based upon specified times and regular intervals per transfer.

In some embodiments, the network interface may perform at least one of the following (or all or a combination thereof): configuring one or more properties of at least one of the scaling module, the service demarcation module, the endpoint scanning module, and the auto recovery module; during horizontal scaling, adding and updating information for new servers at runtime to handle increased volumes of transfers; during vertical scaling, controlling core processing for each transfer as parallel processes to optimize transfer throughput; and setting up and scheduling file transfers. The system may also include at least one MFT engine server that effects core processing for file transfers as parallel processes, with at least one engine server hosting a respective engine service application. In one embodiment, a queue manager within each MFT engine server maintains a configurable job queue, with each job representing a process available to transfer an individual file, and wherein a maximum number of parallel processes per file transfer is configurable from the network interface to adjust total throughput. The queue manager may determine whether there are available jobs and if a current job count is less than a maximum available jobs per file transfer type, obtains a new job from the job queue to process, and if the total number of jobs currently equal the maximum available jobs per file transfer type, coordinates with other MFT engine servers to find one with job resources available to process new jobs. In one embodiment, servers are placed in one or more designated security network zones and regulatory network zones during service demarcation. File transfers can be configured one separate servers so as to separate critical file transfers from non-critical transfers. The auto recovery module may identify and restart out-of-sync transfers by executing a process that synchronizes file control information in a database with physical files on a disk. In one embodiment, the system further includes a display module for displaying at least the alerts generated by the endpoint scanning module, wherein the network interface is configured to receive instructions for addressing the connectivity issues.

A system is also provided for a scalable, load-balanced architecture that includes facilities for managed file transfer ("MFT") in a network. The system includes at least one engine and trading partner gateway ("TPG") server, at least one MFT engine, a scheduling module, and a directory watching module. The engine(s) TPG server may provide a common gateway for access to a MFT platform, where the TPG servers are added as new instances are configured within a server cluster. The MFT engine(s) may effect core processing for file transfers as parallel processes to optimize transfer throughput, with the engine(s) hosting a respective engine service application(s). The scheduling module may perform scheduling of each file transfer at specific intervals. The directory watching module may utilize a directory scanning process to detect incoming files.

In one embodiment, upon detecting the incoming files, the directory watching module moves the detected files to an MFT engine file system for processing. In another embodiment, the scheduling module may contact the MFT engine server(s) via the load balancer to initiate a file transfer process by pulling one or more files from a remote partner server.

In some embodiments, system is provided for managing file transfers that includes facilities for dedicating different servers fir MFT in a network. The system includes at least one TPG server, at least one MFT engine server, at least one production server group, and at least one secure transfer server group. The TPG server may provide a common gateway for access to a MFT platform. The MFT engine server(s) may effect core processing for file transfers as parallel processes to optimize transfer throughput. The production server group(s) may include at least one TPG server paired in correspondence with at least one MFT engine server. The secure transfer server group(s) may include at least one TPG server paired with an MFT engine server. The system further includes demarcation points that are determined across an MFT server cluster so that every file transfer type is associated with only one server group.

In some embodiments, another system is provided for managing file transfers that includes facilities for periodic endpoint connectivity scanning for MFT in a network. The system includes at least one TPG server, at least one MFT engine server, a scheduling module, a directory watching module, and an MFT platform. The TPG server(s) may provide a common gateway for access to a MFT platform. The MFT engine server(s) may effect core processing for file transfers as parallel processes to optimize transfer throughput. The scheduling module may perform scheduling of each file transfer at specific time intervals. The directory watching module may utilize a directory scanning process to detect incoming files. The MFT platform may include a network interface. The network interface may perform at least one of: communicating over the network; assigning each TPG server and each MFT engine server to one of a locked server group in a locked state and an unlocked server group in an unlocked state, such that an engine assigned to a locked state continues to process files in transmit but will not accept new files; and configuring individual file transfers as locked transfers and unlocked transfers without impact to any other file transfer.

The scheduling module may cease to invoke file transfer executions based on whether the scheduling module is associated with a locked server group, and the directory watching module may determine whether to cease file transfer executions based on whether the directory watching module is associated with a locked server group.

In some embodiments, a system is also provided for MFT in a network that includes facilities for scaling up or down dynamically without requiring restart during runtime horizontal and vertical scaling. The system includes at least one TPG server, at least one MFT engine server, a scheduling module, and an MFT platform. The TPG server(s) may provide a common gateway for access to a MFT platform. The MFT engine server(s) may effect core processing for file transfers as parallel processes to optimize transfer throughput. The scheduling module may perform scheduling of each file transfer at specific time intervals. The MFT platform may include a network interface. The network interface may perform at least one of: communicating over the network; adding engine servers and TPG servers; and configuring file transfer throughout per server.

In some embodiments, the system includes a queue manager module within the MFT engine server that initiates each file transfer as an individual job, tracks job status, and manages a queue of pending jobs if server resources are busy, with the queue manager initiating transfer as upending job upon locating one or more engine servers with resources available to process the files. The MFT platform can be further configured to determine if a current job count is less than a maximum number of jobs for a particular transfer type and, if so, obtain a new job to process from the job queue.

System (e.g., all systems) components can automatically adopt a new configuration once additional servers are added and updated.

In some embodiments, a system is provided MFT a network, the system including at least one TPG server, at least one MFT engine server, a scheduling module, an auto recovery module, and an MFT platform. The TPG server(s) may provide a common gateway for access to a MFT platform. The MFT engine server(s) may effect core processing for file transfers as parallel processes to optimize transfer throughput. The scheduling module may perform scheduling of each file transfer at specific time intervals. The auto recovery module may ensure accuracy of control information (e.g., all control information) in a database. The MFT platform may include a network interface for performing at least one of: communicating over the network; obtaining file configuration data and lists of files in inbound directories; and exploring and updating the files (e.g., all of the files) with accurate file information.

In some embodiments, the MFT platform is further configured to check a status of each file and cross-check the file status against a status of the file control information in the database so that the latter may be updated. The MFT platform is further configured to compare file processing time against a predefined threshold time determined by the scheduling module, such that when the file processing time exceeds the threshold time, a task sequence number is verified to ensure synchronization of the system and database. The auto recovery module is configured to update a database record with a retry status that ensures the scheduling module will fetch records (e.g., all records) with the retry status and invoke the engine to start and complete normal file transfer.

Computer-readable instructions that may be recorded on a non-transitory medium can, when executed, perform one or more steps of the methods, functions, or interactivity described herein.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 11 shows an example of a server configuration page used to assign each server to a server group.

FIG. 12 shows an example of a file transfer configuration page used to assign each file transfer type to a server group.

FIG. 14 shows an example of a server configuration page used to assign an engine server to a "Locked" state or an "Online" state.

FIG. 15 shows an example of a server configuration page used to assign an individual file transfer to a "Locked" state or an "Online" state.

FIG. 17 shows an example of a task execution dashboard showing creation of a successful record for each task.

FIG. 18 shows an example of a task execution dashboard showing assignment of a "Retry" status to a failed task execution.

DETAILED DESCRIPTION

Now referring to the figures, wherein like numbers represent like elements, a managed file transfer (MFT) method and system as described herein may be implemented in connection with a networking apparatus that includes hardware, software, or, where appropriate, a combination of both. It is contemplated that functional implementation of any invention described herein may be implemented equivalently in firmware and/or other available functional components or building blocks, and that networks may be wired, wireless, or a combination of wired and wireless.

Figure 1:
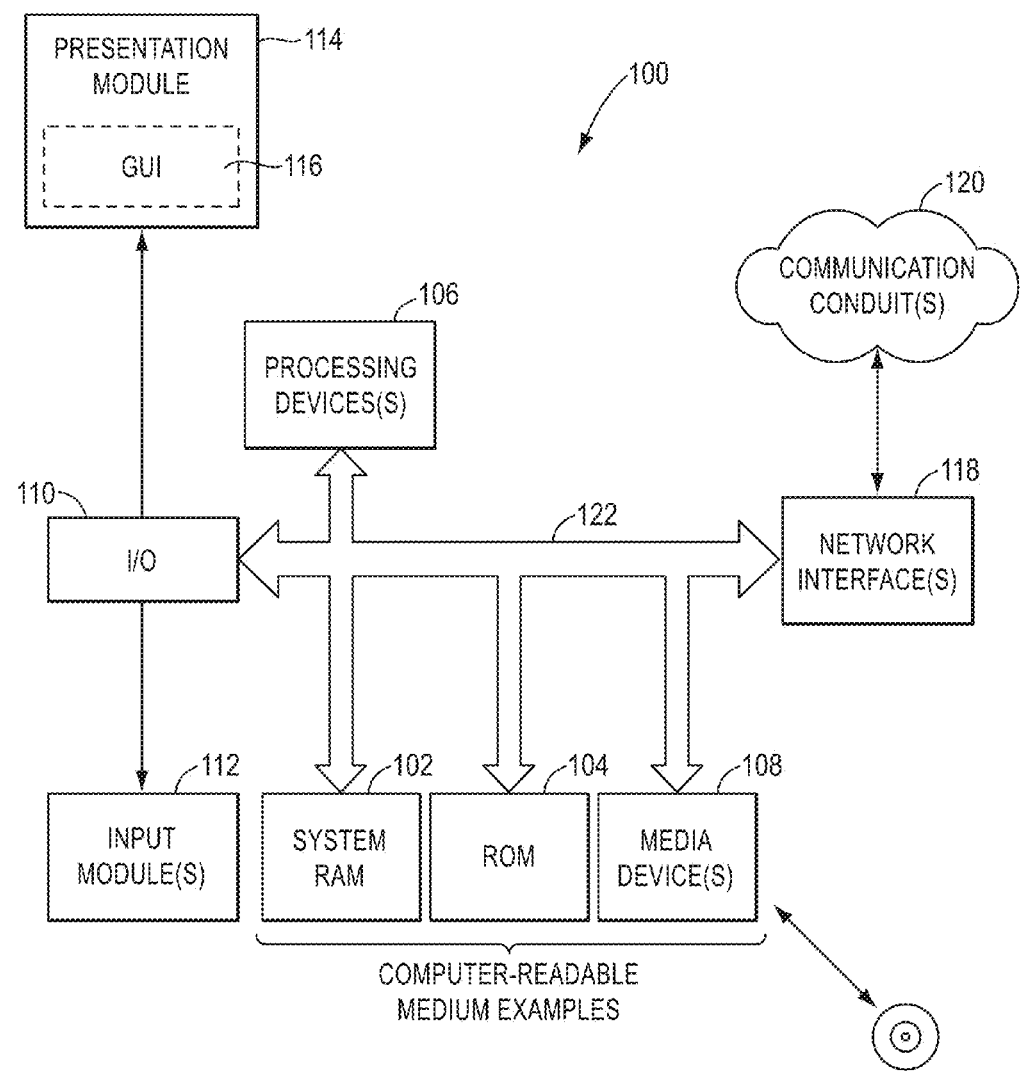
FIG. 1 shows an example of a computing environment in which embodiments of the presently disclosed system and method may be implemented.

FIG. 1 sets forth illustrative electrical data processing functionality 100 that can be used to implement aspects of the functions described herein. In one case, the processing functionality 100 may correspond to a computing device that includes one or more processing devices. The computing device can include a computer, computer system, or other programmable electronic device, including a client computer, a server computer, a portable computer (including a laptop and a tablet), a handheld computer, a mobile phone (including a smart phone), a gaming device, an embedded controller, and any combination and/or equivalent thereof (including touchless devices). Moreover, the computing device may be implemented using one or more networked computers, e.g., in a cluster or other distributed computing system. It is understood that the exemplary environment illustrated in FIG. 1 is not intended to limit the present disclosure, and that other alternative hardware and/or software environments may be used without departing from the scope of this disclosure.

For clarity, as used herein, the term "server" includes one or more servers. A server can include one or more computers that manage access to a centralized resource or service in a network. A server can also include at least one program that manages resources (for example, on a multiprocessing operating system where a single computer can execute several programs at once). Further, the terms "computing device," "computer device," "computer," and "machine" are understood to be interchangeable terms and shall be taken to include any collection of computing devices that individually or jointly execute a set (or multiple sets) of instructions to perform any one or more of the methods discussed herein.

The processing functionality 100 can include volatile memory (such as RAM 102) and/or non-volatile memory (such as ROM 104 as well as any supplemental levels of memory, including but not limited to cache memories, programmable or flash memories, and read-only memories, including dynamic read-only memories). The processing functionality can also include one or more processing devices 106 (e.g., one or more central processing units ("CPUs"), one or more graphics processing units ("GPUs"), one or more microprocessors (μP) and similar and complementary devices) and optional media devices 108 (e.g., a hard disk module, an optical disk module, etc.).

The processing functionality 100 can perform various operations identified above with the processing device(s) 106 executing instructions that are maintained by memory (e.g., RAM 102, ROM 104, or elsewhere). The disclosed method and system may also be practiced via communications embodied in the form of program code that is transmitted over some transient or non-transient medium, such as over electrical wiring or cabling, through fiber optics, wirelessly or via any other form of transmission, wherein, when the program code is received and loaded into and executed by a machine, such as an EPROM, a gate array, a programmable logic device ("PLD"), a client computer, or the like, the machine becomes an apparatus for practicing the presently disclosed system and method. When implemented on a general-purpose processor, the program code combines with the processor to provide a unique apparatus that operates to invoke the functionality of the presently disclosed system and method. Additionally, any storage techniques used in connection with the presently disclosed method and/or system may invariably be a combination of hardware and software.

The processing functionality 100 also includes an input/output module 110 for receiving various inputs from a user (via input modules 112) and for providing various outputs to the user. One particular output mechanism may include a presentation module 114 and an associated graphical user interface ("GUI") 116 incorporating one or more I/O devices (including but not limited to a display, a keyboard/keypad, a mouse and/or other pointing device, a trackball, a joystick, a haptic feedback device, a motion feedback device, a voice recognition device, a microphone, a speaker, a touch screen, a touchpad, a webcam, 2-D and 3-D cameras, and similar and complementary devices that enable operative response to user commands that are received at a computing device).

Otherwise, user input may be received via a computing device coupled to another computing device over a network. The processing functionality 100 can also include one or more network interfaces 118 for exchanging data with other devices via one or more communication conduits 120. One or more communication buses 122 communicatively couple the above-described components together. Bus 122 may represent one or more bus structures and types, including but not limited to a memory bus or memory controller, a peripheral bus, a serial bus, an accelerated graphics port, a processor or local bus using any of a variety of bus architectures, and similar and complementary devices. This configuration may be desirable where a computing device is implemented as a server or other form of multi-user computer, although such computing device may also be implemented as a standalone workstation, desktop, or other single-user computer in some embodiments In such configuration, the computing device desirably includes a network interface in operative communication with at least one network. The network may be a LAN, a WAN, a SAN, a wireless network, a cellular network, radio links, optical links, and/or the Internet, although the network is not limited to these network selections. It will be apparent to those skilled in the art that storage devices utilized to provide computer-readable and computer-executable instructions and data can be distributed over a network.

The computing device can operate under the control of an operating system that executes or otherwise relies upon various computer software applications. For example, a database management system ("DBMS") may be resident in the memory to access one or more databases (not shown). The databases may be stored in a separate structure, such as a database server, connected, either directly or through a communication link, with the remainder of the computing device. Moreover, various applications may also execute on one or more processors in another computer coupled to the computing device via a network in a distributed or client-server computing environment.

Transmission and reception of data or information can be between computers, databases, storage devices, or internal computer equipment and are carried by transmitting electrical signals (e.g., carrying packets or messages) using computer equipment and are also carried by generating signals in response (e.g., consistent with the steps or processes described herein). A computer or computer system can be one or more computers. A network can also involve multiple networks.

As used herein, a "user" may be a single user or a group of users. As used herein, the term "user" (or "user device," "client device," "network-connected device," or "device") can refer to any electronic apparatus configured for receiving control input and configured to send commands or data either interactively or automatically to other devices. As used herein, the term "process" or "method" refers to one or more steps performed at least by one electronic or computer-based apparatus. Those of ordinary skill understand from the present description that the illustrative processes or steps described herein can be implemented in different sequences or orders if desired. Also, steps can be removed, modified, or added without varying from the scope and principles of the present invention.

As used herein, "control information" of any file transfer flow is the information about the file identity and the processing state of a file transfer. It is a representation of the physical state of a the file in transit. The control information is used by MFT processes to make decisions about the next stage of the processing for the file, scheduling the priority of the processing, and locating the physical file on the file system across the network. Control information is akin to the speedometer or the dials of an automobile which provide a view into the actual physical variables. Control information includes, but is not limited to, name of the file, location of the file, size of the file, the processing stage, the success or the failure state of the last processing stage, file checksum, etc.

Figure 3:
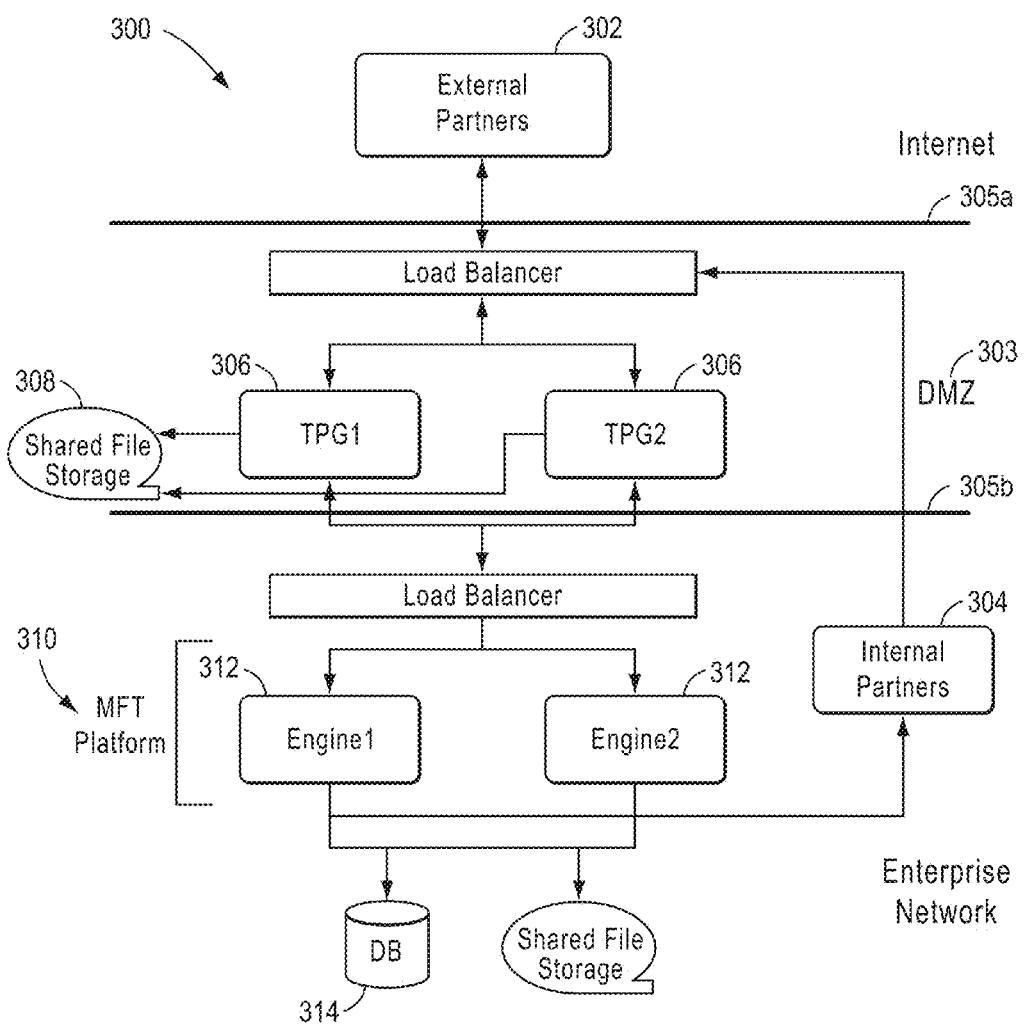
FIG. 3 shows an exemplary managed file transfer ("MFT") system, including an MFT platform integral therewith.
Figure 4:
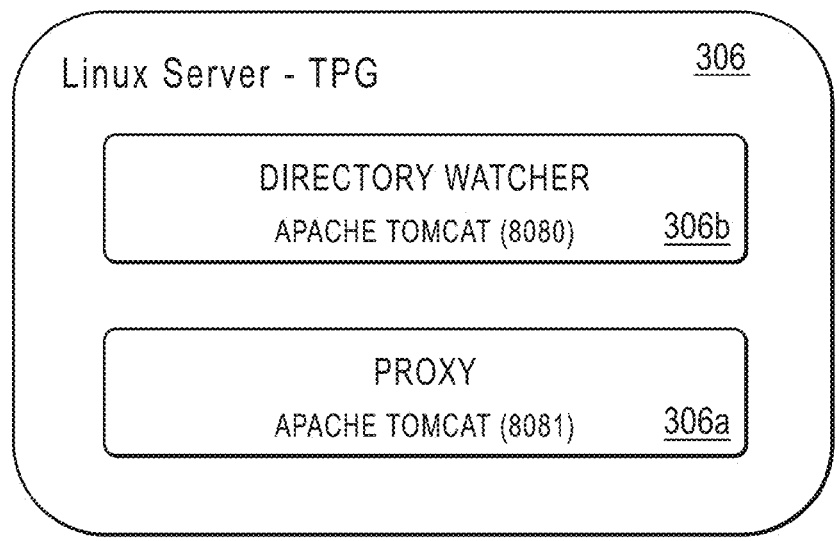
FIG. 4 shows an exemplary trading partner gateway ("TPG") server configuration that may be used within the MFT system of FIG. 3.

With reference to FIG. 3, an exemplary MFT system 300 is provided by which communication between external partners 302 and internal partners 304 is established over a network. An exemplary network is shown in FIG. 3 as the Internet, although other networks are contemplated. It is understood that if desired, the system can be configured to implement architecture in which users may join any symbiotic network that is built, maintained, and/or nourished by the administrator to facilitate file transfers and processing thereof. All files transferred from external partners 302 arrive at one of multiple TPG servers 306, and these servers act as a DMZ 303 for external partners (e.g., to protect servers included in an enterprise network, thereby providing added security). De-Militarized Zone ("DMZ") 303 is the network zone created by physical or logical separation of the network to provide an additional layer of security, when exposing enterprise functionality to the trading partners outside of the corporate enterprise network. The DMZ is implemented by creating a set of firewalls: a firewall 305a between the public network for the Internet) and the DMZ network zone and a second firewall 305b between the DMZ network zone and the corporate enterprise network. The application components residing in DMZ 303 are designed and developed as a proxy. The proxies handle the request and the response and forward them to the applications in the enterprise network, and vice versa in case of request or response being originated by the enterprise application.

Files from internal partners can come to engine 312 directly bypassing DMZ 303 if their collaborating internal partner servers are co-located on the same subnet as engine 312 itself. TPG server 306 (e.g., each TPG server) includes a proxy agent 306a that receives task instructions through calls and executes the tasks required during a file transfer. TPG server 306 also includes a directory watcher 306b that continuously runs a process to watch for any new file arrival. TPG servers 306 may have a shared file storage 308 resident in the DMZ layer as shown in FIG. 3. TPG servers 306 provide a common gateway for access to (MFT) platform 310. MFT platform 310 may be accessed over the network via a network interface (not shown), which interface may be accessed via one or more browsers or one or more desktop and/or mobile applications.

Figure 5:
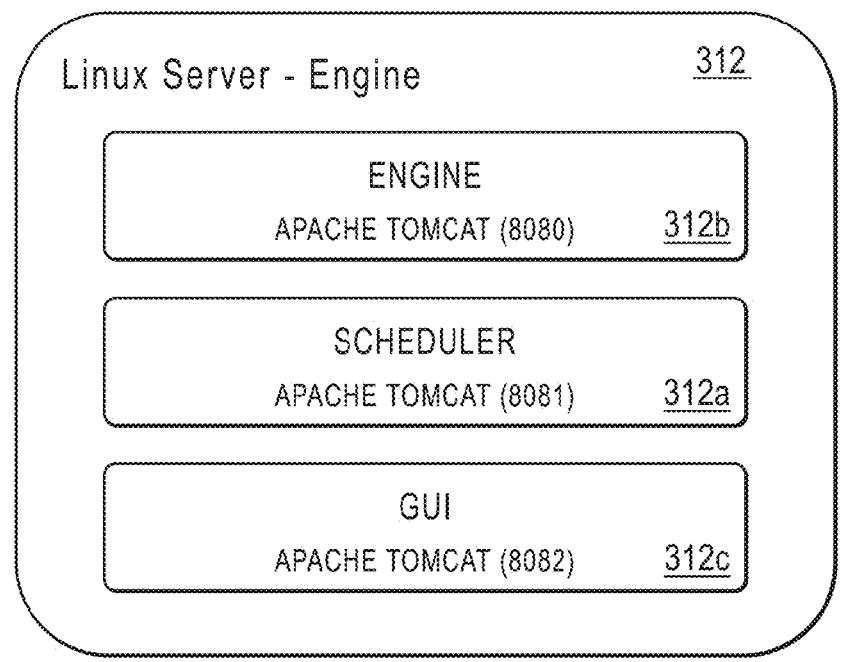
FIG. 5 shows an exemplary engine server configuration that may be used within the MFT system of FIG. 3.

Referring to FIG. 3 and further to FIG. 5, MFT platform 310 includes at least one engine server 312 for executing file transfer processes. Each engine server 312 includes an engine 312a that runs transfer processes by executing different tasks individually, thereby managing the thread pool to ensure that every service is using only allocated resources. Engines 312a also expose different operations like "execute transfer," "get configuration details," "test node," "add keys," etc. Engine servers 312 may contain one or more utility services to maintain MFT platform 310 (e.g., syncing the database info with physical files for failures, cleaning up old files and data, removing unknown files, etc.).

As further shown in FIG. 5, each engine server 312 may have a scheduler module 312b ("scheduler") associated therewith that reads a transfer configuration (e.g., from a database 314) and schedules jobs (e.g., all jobs) based upon specified times and regular intervals per transfer (e.g., hourly, daily, etc.). Scheduler 312b then triggers an engine web service call at the specified time to execute the transfer job, which call includes both normal and "retry" transfers (e.g., file transfers that are "retried" when a failure occurs, as further described herein below). Scheduler 312b may be complemented by one or more applications that initiate file transfer upon receipt of one or more instructions. Such instructions may be received via and/or communicated by a mobile device (e.g., as by near-field communication or by presentation of a confirmation code that may be provided as a bar code, QR code, or any comparable or equivalent confirmation code). Scheduler 312b and directory watcher 306b operate within the servers and, together with the servers, form a group within an MFT cluster.

Also as shown in FIG. 5, each engine may have a graphical user interface module 312c associated therewith. GUI module 312c provides complete access to MFT platform 310 on a role basis (e.g., dependent upon an administrative role and responsibility level). Administrators can create, modify and delete transfer configurations from a user interface ("UI") as well as schedule and run different types of reports. GUI module 312c enables general users to track file transfers from one or more dashboards provided on a UI and fetch historical data and graphs for analytics. GUI module 312c may support a self-service portal (not shown) that allows administrators and authorized users to add, update, and configure file transfers without any technical resource involvement. Administrators may have different degrees of authorization relative to authorized users. For example, administrators may run system 300 while authorized users, while not running system 300, can take some type of action with respect to file transfer (e.g., creating a new file transfer). A user, in contrast, may not be able to take any action but may be able to view file transfers and their status. Authorized users may be subject to various levels of authentication prior to taking any action.

Figure 2:
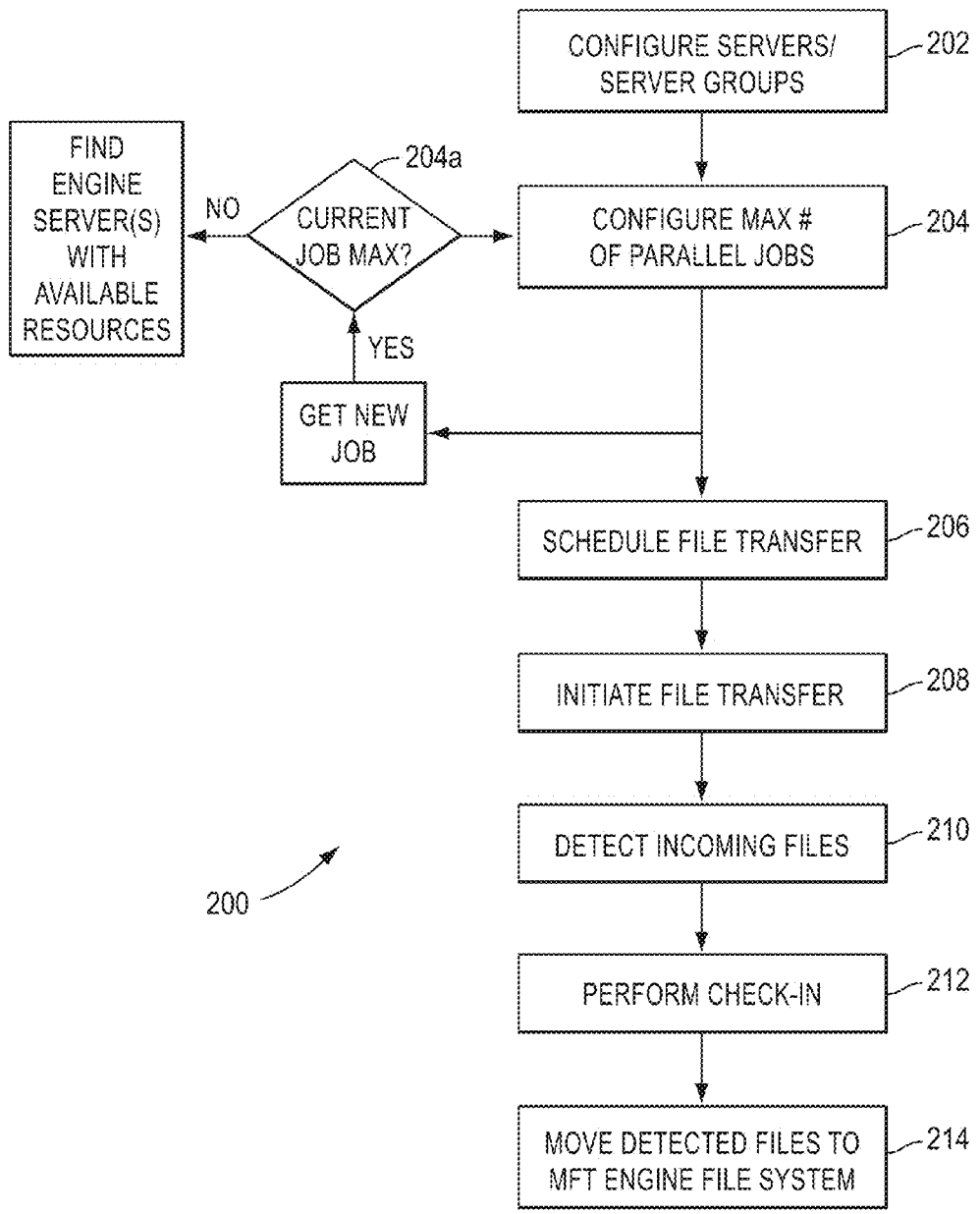
FIG. 2 shows an exemplary method for managing file transfers via a network interface.

Referring to FIG. 2, process 200 includes a server configuration step 200 during which a user (e.g., an administrator) configures engine servers 312 and TPG servers 306 along with any server groups (as further described herein). In support of such configuration, MFT platform 310 further includes a dynamic scaling module that scales up or down dynamically without requiring restart during runtime horizontal and vertical scaling. In horizontal scaling, an architecture may be provided that includes a networked server group that grows with the physical addition of more servers as needed.

Figure 6:
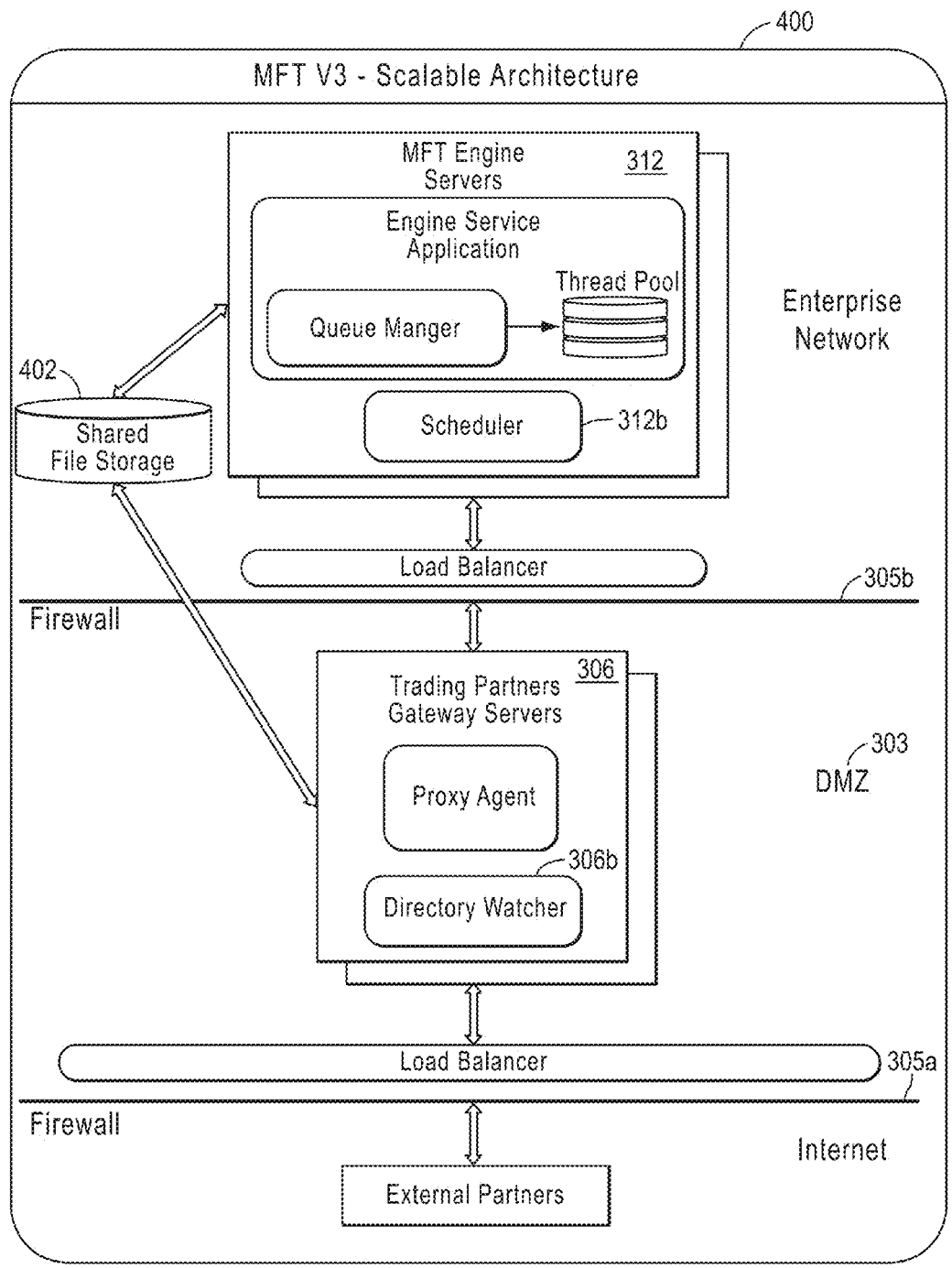
FIG. 6 shows an example of a horizontally scalable architecture that may be used with the MFT system of FIG. 3.

FIG. 6 shows an exemplary horizontally scalable architecture 400 in which a plurality of MFT engine servers 312 are provided in correspondence with a plurality of TPG servers 306.

Database 402 is preferably positioned behind firewalls as part of the enterprise network, such as behind firewalls 305a and 305b.

All files are stored in a common shared file storage 402. Thus, to handle an increased volume of transfers, engine servers 312 and TPG servers 306 can be added within a load-balanced architecture as shown as long as new instances are configured properly (e.g., with proper IP/DNS settings, etc.). With additional engine servers, core processing (e.g., encryption, decryption, etc.) can be performed in parallel and thereby decrease the overall time required to transfer designated files to destination partners. With additional TPG servers 306, higher file transfer throughout is attained within network bandwidth limits.

Figure 7:
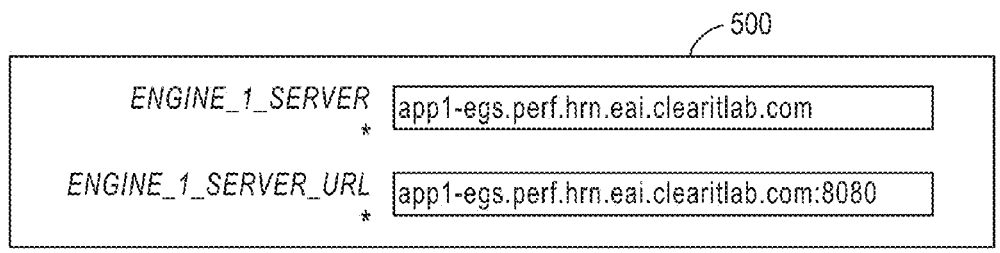
FIG. 7 shows an example of a server configuration page used to add and update servers.

Once additional servers are physically installed and networked, a system administrator may add and update server information (e.g., through an exemplary server configuration page 500 as shown in FIG. 7). With increased horizontal scaling, components of MFT platform 310 interact with one another without interruption. In addition, server components can be switched offline during maintenance through a simple configuration change (e.g., effected via an MFT administrator application accessed via a UI).

Figure 8:
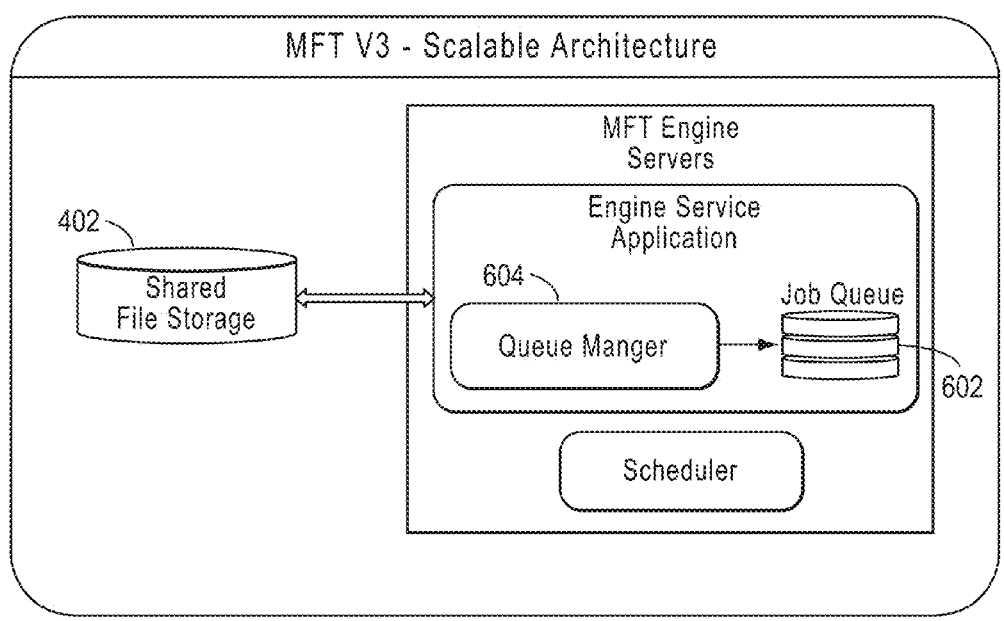
FIG. 8 shows an example of a vertically scalable architecture that may be used with the MFT system of FIG. 3.

Process 200 also includes a job configuration step 204 during which a maximum number of jobs may be configured per file transfer type. FIG. 8 shows an exemplary vertically scalable architecture 600 within the dynamic scaling module in which a configurable job queue 602 allows adjustment of file transfer throughput per server. A maximum number of files per transfer type can be controlled (e.g., from a UI similar to server configuration page 500 shown in FIG. 7) to adjust total throughput. Within each engine server 312, a queue manager 604 as shown in FIG. 8 maintains job queue 602, with each job representing a process available to transfer an individual file.

Once a system administrator increases a size of job queue 602 at job configuration step 204, more files are able to be processed in parallel. Queue manager 604 determines whether there are available jobs to process. As shown at step 204a of FIG. 200, if a current job count is less than a maximum number of jobs for a particular transfer type, queue manager 604 obtains a new job to process from job queue 602. If a total number of jobs is currently at the maximum for a particular transfer type, queue manager 604 coordinates with other engine servers 312 to locate one with resources available to process the files.

Thus, when MFT system 300 processes large quantities of files in a single run, increased load is realized. Individual file transfers may experience heavier traffic than others, therefore benefitting from multiple jobs running in parallel with each of the jobs acting on an individual file. Jobs can therefore be evenly distributed among multiple servers to avoid heavy load on any one server. For example, while typically realized capacity is 60%-70% of throughput, system 300 may realize higher levels of throughput until a maximum number of threads are in place.

Once additional servers are added and updated within the architecture, and associated URLs are updated, all system (e.g., all system) components automatically adopt the new configuration. At step 206 of process 200 shown in FIG. 2, scheduler 312b performs scheduling of each file transfer at specific time intervals, at which time scheduler 312b contacts an engine server 312 via a load balancer to initiate a file transfer process (i.e., pull files from a remote partner server) (see step 208 of FIG. 2). Based on which engine server is associated with the scheduler, the latter will contact the associated load balancer through which the engine server is fed. Similarly, directory watcher 306b utilizes a directory scanning process to detect incoming files and thereafter validate their configuration accuracy (see steps 210 and 212 of FIG. 2). Once detected, directory watcher 306b moves the detected incoming files to the database for processing. Whenever needed, platform component (e.g., all platform components) configurations can be refreshed by an administrator using the GUI. Scaling (both horizontal and vertical) improves file transfer throughput and resource efficiency during core processing, thereby offering failover protection, load balancing, and overall reduced downtime.

EXAMPLE

Figure 9A:
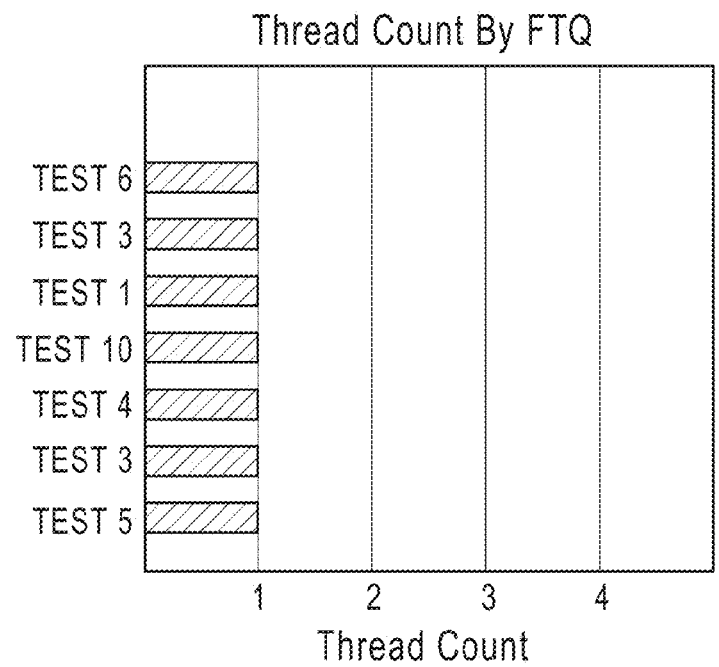
FIG. 9 shows exemplary dashboards that demonstrate parallel processing of jobs by an MFT system.
Figure 9B:
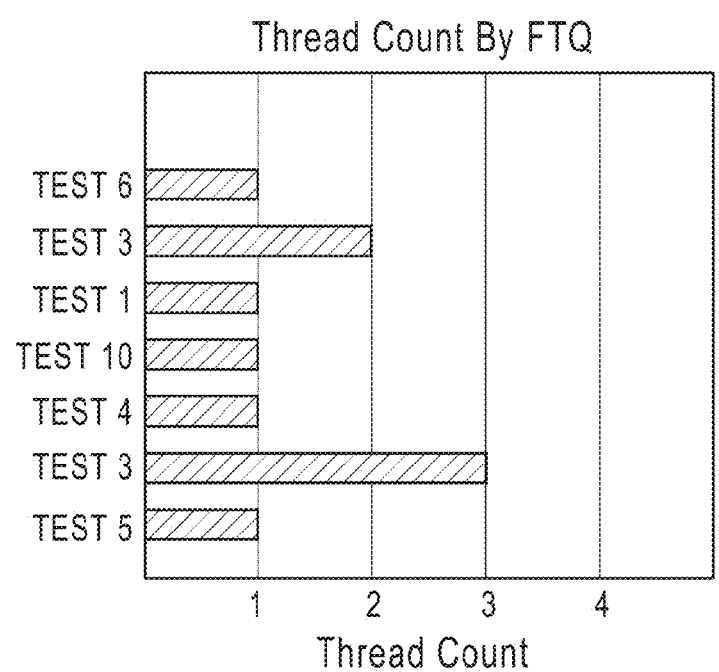
Figure 10:
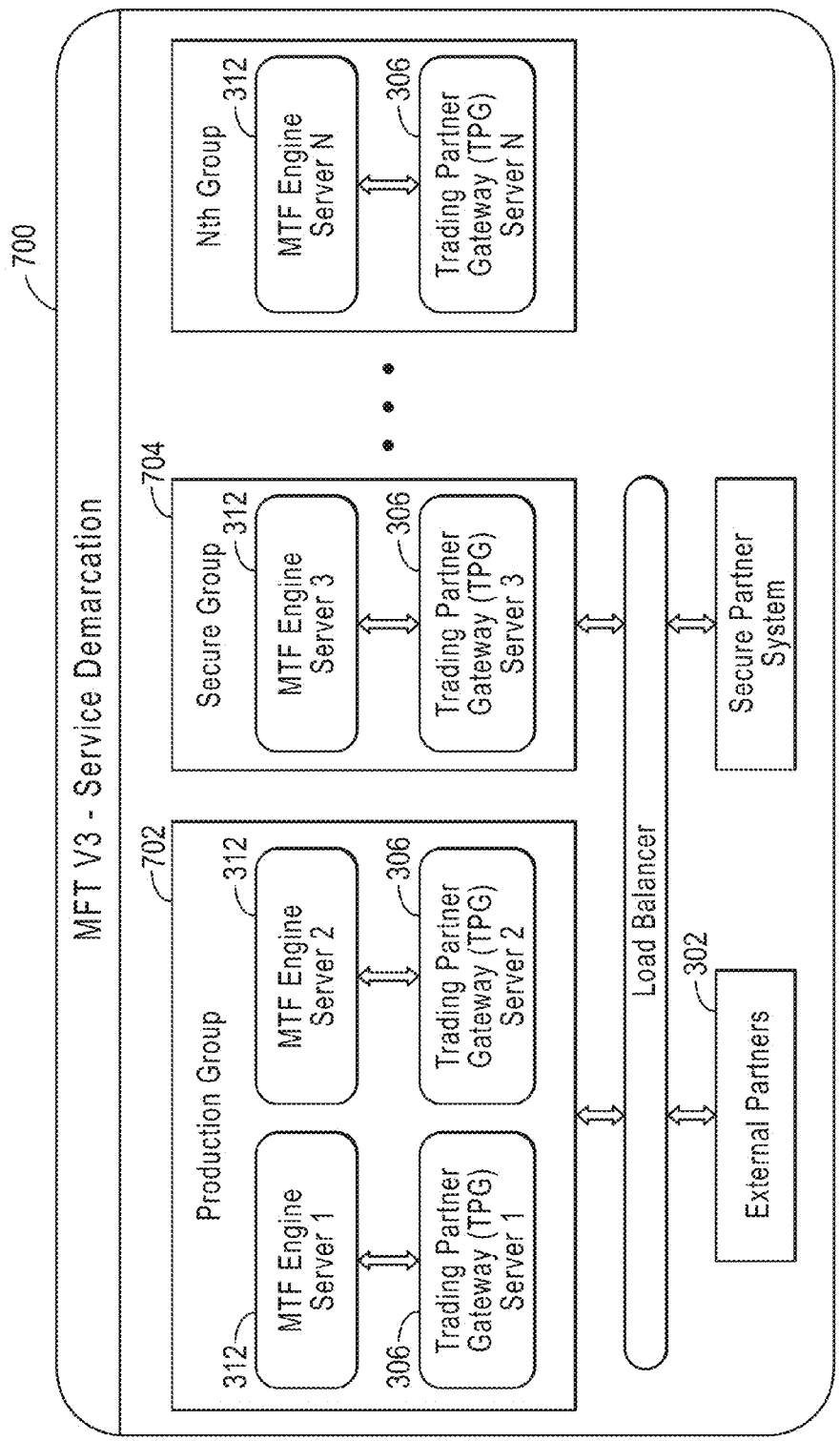
FIG. 10 shows an exemplary service demarcation utility that may be used with the MFT system of FIG. 3.

As shown in FIG. 9, exemplary dashboards (a) and (b) demonstrate which jobs (and the quantity of each) that are processed in parallel. Dashboards (a) and (b) demonstrate real-time job utilization. The X-axis shows a job count scaled from 0 to a maximum number of available jobs to process for a particular file transfer type. The Y-axis shows a list of individual file transfer types. Dashboard (a) represents a graphical view of real-time job utilization with only a maximum of one job per transfer type. It is evident that performance can be impacted, resulting in a backlog. Dashboard (b) graphically shows the impact of utilizing more parallel jobs after configuration change, thus reducing the opportunity for backlog. With further reference to FIG. 2 and additional reference to FIGS. 10, 11, and 12, MFT platform 310 further includes a service demarcation module 700 for dedicating different servers for different kinds of file transfers. FIG. 10 shows that there can be N number of engine servers 312 assigned to handle specific file transfers. A point-of-service demarcation is represented by a grouping of one or more server pairs into at least one production group 702 and further grouping of one or more additional server pairs into at least one secure transfer group 704.

Recalling that TPG servers 306 act as a DMZ for external partners 302, and that engine servers 312 and TPG servers 306 can be easily added and removed within existing groups (or assigned to newly created groups), demarcation points can be determined across an MFT server cluster. A system administrator may then add and/or update a server URL and server group information. As an example, FIG. 11 shows an exemplary server configuration page 800 through which a user can configure server groups as needed by entering a new server URL and group name. In the example shown in FIG. 11, engine server "1" is assigned to the "Secure" group. Each engine server can be assigned to one and only one server group, ensuring secure control over file transfers.

In conjunction with the server configuration, a similar "Server Group" parameter may be introduced at the file transfer level. Every file transfer type can be associated with one and only one server group (e.g., for example, a partner with sensitive files to transfer will be assigned to the "Secure" group). FIG. 12 shows an exemplary file transfer configuration page 850 in which an administrator may update file transfer associations. Both server and file transfer configuration may be conducted at any time during process 200.

Once the group assignment is updated, system components (e.g., all system components) automatically adopt the new configuration. Queue manager 604, being a core process within engine server 312 that initiates each file transfer as an individual job, tracks job status, and manages a queue of pending jobs if server resources are busy. Based on a group associated with engine server 312, queue manager 604 determines whether to initiate transfer of a file or queue the file as a pending job only if the file is associated with the same group. Scheduler 312b, meanwhile, selectively requests engine server 312 to process a file associated with the same group. Directory watcher 306b selectively monitors incoming files and requests engine server execution based upon the associated group for that requested engine server.

Service demarcation is important for both service providers and end-clients. The point of demarcation is a specific point of control over how IT staff chooses site or server configuration, client access, and network endpoints that fit within a designed service or security plan. Depending upon IT security requirements, the presently disclosed system and method restrict a client's access to only the client's own inbound directory for dropping files. Once the user is authenticated (e.g., through an enterprise active directory or LDAP), the user is confined into pre-defined segregated workspaces. For example, an external client may log into MFT system 300 as an SFTP user that should not be allowed to navigate outside of the user's home directory. A desired level of control over service and security is therefore attained by segregating individual servers into specific file processing groups and pre-defining user workspace access. Partners with sensitive file data can reliably secure file transfer without added security imposed upon the entire MFT system.

As an example, transfers by telecommunications companies may include customer proprietary network information ("CPNI"), including but not limited to data collected about a consumer's calls, where privacy concerns raise the need for additional security to some MFT systems. Systems lacking service demarcation require an all-or-none approach where added security would be imposed on an entire MFT system to accommodate CPNI related partners. Systems with demarcation, however, can segregate servers with equipped security (i.e., secure network endpoint or storage) from other production servers. Similar approaches can be taken for compliance with PCI, SOX, HIPAA, privacy, and other requirements that proscribe data encryption, auditability, and other administrative controls.

Figure 13A:
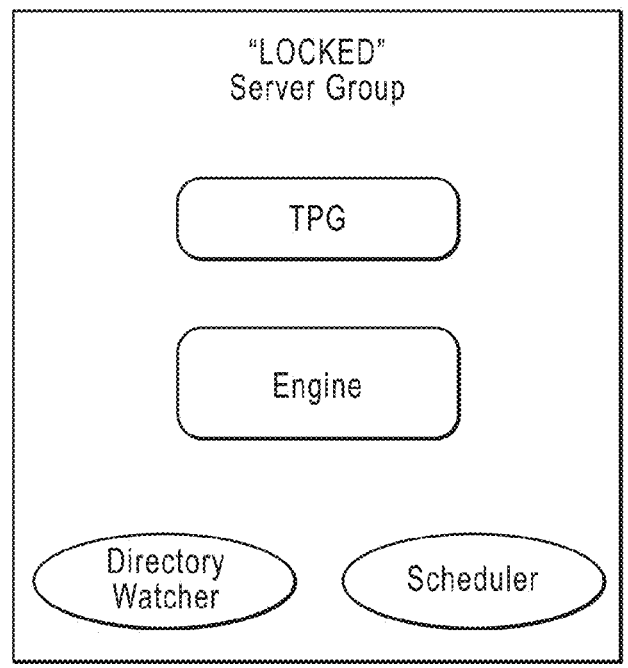
FIG. 13 shows an example of "Locked" and "Online" server groups established by an endpoint scanning module of the MFT system.
Figure 13B:
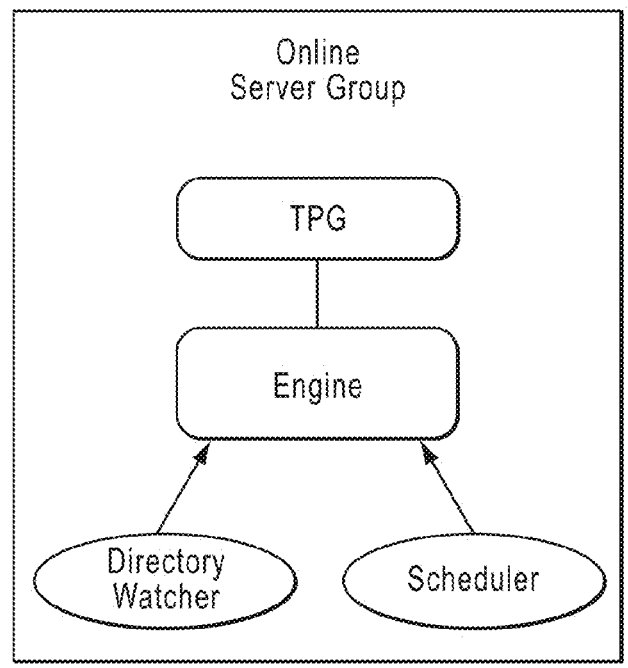

With further reference to FIG. 3 and additional reference to FIGS. 13, 14, and 15, MFT platform 310 further includes an endpoint scanning module for periodic endpoint connectivity scanning. The endpoint scanning module generates alerts for connectivity issues to be addressed before transfers start failing. A user may elect to receive real-time alerts of planned connectivity changes and unplanned connectivity issues. Such inputs may be stored in a database as user preferences that can be later accessed by the MFT system when the user accesses the system.

Hot deployment is the ability to carry out maintenance and upgrade activities without disruption to running production processes. A disruption will typically occur when an IT technician has to take personal action to remove a physical server from the network in order to reconfigure one or more servers running the platform. To initiate hot deployment within MFT system 300, an administrator may assign an engine server 312 within an appropriate server group to identify the assigned engine server as being "Locked" or "Online" (see FIG. 13). Engine servers may be assigned through an appropriate UI such as exemplary server configuration page 900 shown in FIG. 14 (which shows engine server "1" having the designed URL as being assigned to the "Locked" state). The administrator may assign any desired number of server groups to "LOCKED" as needed so that there will be at least one group always available online. The administrator may optionally lock groups (e.g., all groups) in the system.

In addition to the server group assignment, a similar "Group" parameter offers the flexibility to disable an individual file transfer without impact to any others. Reference is made to FIG. 15 for an exemplary configuration of file transfers that may be "Locked" via a file transfer configuration page 950 as shown.

Once locking is performed, affected system components within a "Locked" group automatically adopt the new configuration. When an engine server within a particular group is assigned to the "Locked" state, the engine server continues to process files in transit but does not accept new files, thereby transitioning into an idle state. The idle state of the whole server group allows the flexibility to reboot or disable that group for any maintenance activity, without impact to file transfer processes running in production. Based upon whether scheduler 312b is associated with a "Locked" group, the scheduler will cease to invoke file transfer executions on a "Locked" engine. Similarly, directory watcher 306b also determines whether to cease file transfer executions based on whether they are associated with a "Locked" group (e.g., see FIG. 13(b) in which the scheduler and directory watcher are associated with an engine in an "Production" server group). When maintenance on one server group is complete, an administrator may perform activity on additional server groups or bring the entire MFT system back online.

Updates to existing components and/or the addition of new components can be performed on a running system without reloading or restarting the components in order for the change to take effect. With respect to MFT system 300, while the maintenance activity is being carried out, the network operations team need not be engaged to route incoming traffic to the server. Maintenance activity is performed in phases without any downtime on the platform. Updates ranging from swapping out physical servers to changing application or web module configuration can be performed transparently and with minimum or zero production downtime. This eliminates the requirement of advance notification to stakeholders of impending backlog during downtime.

Figure 16:
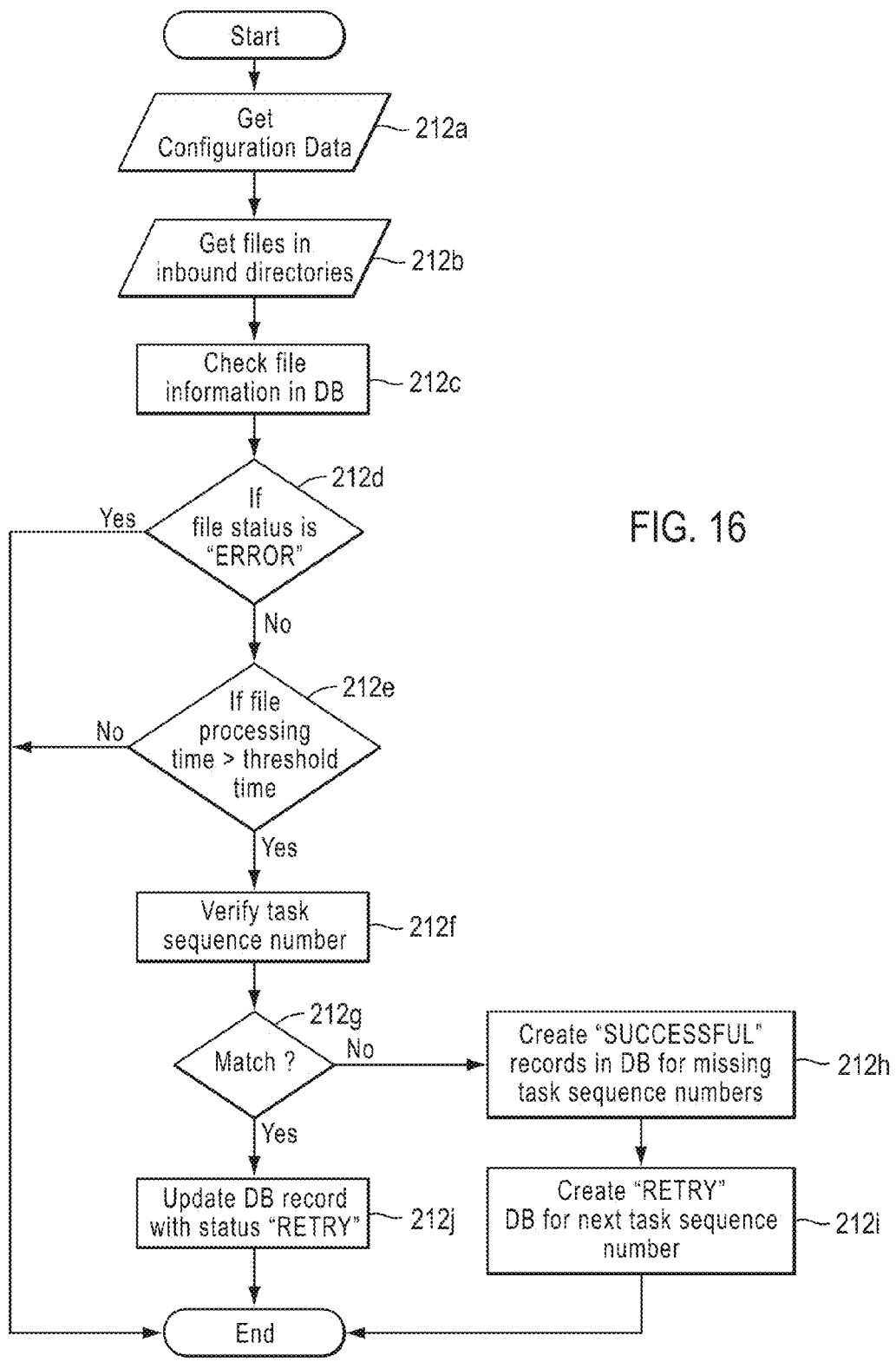
FIG. 16 shows an exemplary auto recovery process used with an auto recovery module of the MFT system.

With further reference to FIG. 3 and additional reference to FIGS. 16, 17, and 18, MFT platform 310 further includes an auto recovery module that automatically identifies the discrepancy between the physical state of the file transfer and its related control or the process monitoring and restarts the file transfer process right from a state where the transfer process left off. In file process management systems, real physical files are stored in a file system, whereas file metadata or control information (e.g., file name, size, location, state of file processing, etc.) is sorted in a database. Auto recovery is an automated process that synchronizes the file system and the metadata in the database.

Access to file configuration data including but not limited to directory location, file pattern, protocol, archive directory, encryption, etc.) may be provided via a UI on a file transfer page (not shown). Such a file transfer page may also provide access to a workflow that defines a series of tasks in sequential order so that an administrator can customize a desired work sequence. Any mismatch between the file system and the database may result in transfer failures. Such mismatch can advantageously serve as a control mechanism to ensure the transfer process, up to a point, has been successful.

At step 212 of process 200 (shown in FIG. 2), MFT platform 310 employs an auto recovery process during which files (e.g., all files) stored in the engine file system are explored to ensure that the control information in the database is updated with accurate file information. An exemplary auto recovery process is shown in FIG. 16. During the auto recovery process, file configuration data is obtained (see step 212a of FIG. 16) and lists of the files in inbound directories are acquired (see step 212b of FIG. 16). The status of each file in the file system is cross-checked against the status of the file control information in the database so that the latter may be updated accordingly (see step 212c of FIG. 16).

Recalling that scheduler 312b will invoke engine server 312 for every file transfer at predefined intervals, each engine 312 executes tasks as per the workflow definition (e.g., in sequential order as defined via the file transfer page). The task may append configuration data including but not limited to job ID, FTQ ID, and task sequence number for every file to ensure each file is uniquely identified in the MFT system. If the status is "ERROR" (see step 212d of FIG. 16), the auto recovery process ends. If the status is not "ERROR," the file processing time is compared against the predefined threshold time (see step 212e of FIG. 16). If the threshold time exceeds the file processing time, the auto recovery process ends. If the file processing time exceeds the threshold time, the task sequence number is verified (see step 212f in FIG. 16). If the MFT file system and database are synchronized, each task will create a successful record in the database (see steps 212g and 212h of FIG. 16). FIG. 17 shows an exemplary task execution dashboard showing creation of a successful record for each identified task.

If any database failure occurs during the task execution, then the file in the file system and the database record are out of sync. To correct this issue automatically (i.e., without manual intervention) and recover from database failures, scheduler 312b invokes the auto recovery process at predefined time intervals. For every file transfer configured in the database, the auto recovery process will obtain the file configuration data and check for files in inbound directories (e.g., all inbound directories). In an example, the auto recovery process verifies the task sequence number in the file system with the database record sequence number (step 212f). If there is a mismatch and the file processing window (e.g., the time during which the file is waiting in the file system) is greater than the configured elapsed time, then the auto recovery process will update/insert the database record with status "R" (see steps 212i and 212j of FIG. 16). FIG. 18 shows an example of a task execution dashboard showing assignment of a "Retry" status to a hung task execution. (e.g., with a status "R" for "Retry"). Scheduler 312b will fetch records (e.g., all records) with status "R" and invoke engine 312 for every record having that status. Engine 312 will thereafter start normal file transfer and complete the file transfer as defined.

Referring back to FIG. 2, at step 214 of process 200, detected files that are verified are moved to an MFT engine file system, indicating conclusion of the instant file transfer and readiness for additional transfers as scheduled.

With scalable architecture as employed with the presently disclosed MFT system and method, increasing MFT resources results in increased throughput performance in a manner proportional to the resources added. MFT scaling capabilities as described herein, coupled with configuration viewing and reporting tools, provide a robust file transfer system that is easily configurable and optimized by IT staff for throughput level as required by business needs. The presently disclosed MFT system and method also ensure that transferred files will be sufficiently secured in the directories to which they are transferred.

The presently disclosed MFT system and method supports both internal and external flow of information runs on a plurality of platforms. Files may be distributed using an array of protocols, including but not limited to FTP, FTPS, SFTP, HTTP, HTTPS, SMTP, POP3,and IMAP. Multiple forms of access controls are also supported, including different types of authentication (e.g., username and password versus digital certificate).

The processes, steps, or methods illustratively described herein can be implemented using the described examples of hardware and network configurations. An MFT system application may be distributed as a software tool configured for mobile applications that is downloaded to users. The application can be implemented partly or entirely using a cloud service. Accessing MFT system 300 may include, for example, using a browser to access an application, logging into a cloud application to interact with the application, or combinations of local and remote software.

It is understood that activity described from a user's perspective also encompasses the related features that are implemented on the system, platform, software, or process as part of providing that activity, operation, or interaction. Terms such as "adapted," "configured," or "implemented" indicate that software, hardware (including computer-readable), and/or combinations thereof are implemented by way of computer programs or circuitry to implement a particular structure or specialized computer system. If the terms are not specifically used, one of ordinary skill in the art will understand that it was contemplated in general or based on the specific context.

One or more features illustratively described herein can be implemented individually or in various combinations. A computer system (e.g., one or more computers) such as computer systems, network, or equipment described herein is configured to perform the illustrative method steps illustratively described herein by way of encoded computer-executable software instructions. As such, the present system, method, or related inventions also relate to a non-transient computer-readable medium configured to carry out any one of the methods disclosed herein. The application can be a set of instructions readable by a processor and stored on the non-transient computer-readable medium. Such medium may be permanent or semi-permanent memory, such as hard drive, floppy drive, optical disk, flash memory, ROM, EPROM, EEPROM, etc., as would be known to those of ordinary skill in the art. Features or characteristics described in one context, process, or device are applicable to other context, process, or devices described herein. The steps of the processes illustratively described herein can be performed in a different order, if desired. Also, steps could be added or removed from the processes illustratively described herein. The processes and systems illustratively described herein can be implemented using the described examples of hardware and network configurations.

A database can be made of multiple devices or storage locations, such multiple databases or multiple devices having memory for storing database content. Computer-executable software can be stored on a single device, multiple different devices, or memory locations.

It is understood that the presently disclosed invention may be provided as a cloud application, or that one or more components thereof may be implemented in a cloud. If desired, the presently disclosed system may be part of an enterprise network, and the DMZ servers may be implemented in a cloud. The managed file transfer system application can also be implemented as part of an enterprise network by implementing the software on servers in the cloud provider. Typically, managed file transfer systems are implemented within an enterprise network for servicing operations within the network behind its security such as firewalls. The network may include or interact with DMZ servers.

It is understood that the presently disclosed invention is not to be limited to the exact configurations as illustrated and described herein. To those of ordinary skill in the art, one or more inventions will be understood to be contemplated from the present application. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A system for managing file transfers, comprising:
at least one server configured to access the system over a network, with the server providing a common gateway for access to a managed file transfer (MFT) platform, the MFT platform comprising:
a network interface for communicating over the network;
an engine for executing file transfer processes;
a scaling module for scaling each file transfer process as parallel processes to optimize transfer throughput, wherein a maximum number of parallel processes per file transfer process is configurable to adjust a total throughput;
a database that contains configuration and process data such that platform components read a transfer configuration from the database and update data at every configurable milestone; and
a common shared file storage.

2. The system of claim 1, wherein the MFT platform further comprises at least one of:
a service demarcation module for dedicating different servers for different kinds of file transfers;
an endpoint scanning module for periodic endpoint connectivity scanning, with the endpoint scanning module generating alerts for connectivity issues to be addressed before transfers start failing;
an auto recovery module for automatically identifying hung transfers and restarting a file transfer process right from a state where the transfer process left off; and
a scheduler module that reads a transfer configuration from the database and schedules jobs based upon specified times and regular intervals per transfer; and
a hot deployment module for carrying out maintenance and upgrade activities without disruption to running production processes.

3. The system of claim 2, wherein the network interface performs at least one of:
configuring one or more properties of at least one of the scaling module, the service demarcation module, the endpoint scanning module and the auto recovery module;
during horizontal scaling, adding and updating information for new servers at runtime to handle increased volumes of transfers; and
setting up and scheduling file transfers;
and at least one MFT engine server that effects core processing for file transfers as parallel processes, with the at least one engine server hosting a respective engine service application.

4. The system of claim 3, wherein a queue manager within each MFT engine server maintains a configurable job queue with each job representing a process available to transfer an individual file.

5. The system of claim 4, wherein the queue manager determines whether there are available jobs to process and:
(1) if a current job count is less than a maximum available jobs per file transfer type, obtains a new job from the job queue to process; and
(2) if a total number of jobs currently equal the maximum available jobs per file transfer type, coordinates with other MFT engine servers to find one with job resources available to process new jobs.

6. The system of claim 3, wherein servers are placed in one or more designated security network zones and regulatory network zones during service demarcation.

7. The system of claim 6, wherein file transfers can be configured on separate servers so as to separate critical file transfers from non-critical transfers.

8. The system of claim 2, wherein the auto recovery module identifies and restarts out-of-sync transfers by executing a process that synchronizes file control information in a database with physical files on a disk.

9. The system of claim 2, further comprising a display module for displaying at least the alerts generated by the endpoint scanning module, wherein the network interface is configured to receive instructions for addressing the connectivity issues.

10. A scalable, load-balanced architecture that includes facilities for managed file transfer (MFT) in a network, comprising:
at least one engine and trading partner gateway (TPG) server providing a common gateway for access to a managed file transfer (MFT) platform, wherein TPG servers are added as new instances are configured within a server cluster;
at least one MFT engine that effects core processing for file transfers as parallel processes to optimize transfer throughput, with the at least one engine hosting a respective engine service application wherein a maximum number of parallel processes per file transfer is configurable to adjust a total throughput;

a scheduling module that performs scheduling of each file transfer at specific time intervals; and a directory watching module that utilizes a directory scanning process to detect incoming files.

11. The architecture of claim 10, wherein the directory watching module, upon detecting the incoming files, moves the detected files to an MFT engine file system for processing.

12. The architecture of claim 10, wherein the scheduling module contacts the at least one MFT engine server via the load balancer to initiate a file transfer process by pulling one or more files from a remote partner server.

13. A system for managed file transfer (MFT) in a network, the system comprising:

at least one trading partner gateway (TPG) server that provides a common gateway for access to a managed file transfer (MFT) platform;

at least one MFT engine server that effects core processing for file transfers as parallel processes to optimize transfer throughput wherein a maximum number of parallel processes per file transfer is configurable from a network interface to adjust a total throughput;

a scheduling module that performs scheduling of each file transfer at specific time intervals; and an MFT platform, comprising:
a network interface for performing at least one of:
communicating over the network;
adding engine servers and TPG servers; and
configuring file transfer throughout per server.

14. The system of claim 13, further comprising a queue manager module within the MFT engine server that initiates each file transfer as an individual job, tracks job status, and manages a queue of pending jobs if server resources are busy, with the queue manager initiating transfer as a pending job upon locating one or more engine servers with resources available to process the files.

15. The system of claim 14, wherein the MFT platform is further configured to determine if a current job count is less than a maximum number of jobs for a particular transfer type and, if so, obtain a new job to process from the job queue.

16. The system of claim 13, wherein system components automatically adopt a new configuration once additional servers are added and updated.

* * * * *